United States Patent [19]

Umeya

[11] Patent Number: 5,859,122
[45] Date of Patent: Jan. 12, 1999

[54] POLYCARBONATE POLYURETHANE RESIN COMPOSITION

[75] Inventor: Shinichi Umeya, Sakai-gun, Japan

[73] Assignee: Nicca Chemical Co., Ltd., Fukui, Japan

[21] Appl. No.: 816,653

[22] Filed: Mar. 13, 1997

[30] Foreign Application Priority Data

Oct. 21, 1996 [JP] Japan .................................. 8-277870

[51] Int. Cl.$^6$ .............................. C08J 3/00; C08K 3/20; C08L 75/00
[52] U.S. Cl. ........................... 524/591; 524/839; 524/840
[58] Field of Search .................................. 524/591, 839, 524/840

[56] References Cited

U.S. PATENT DOCUMENTS 4,190,566  2/1980  Noll et al. .............................. 524/839

FOREIGN PATENT DOCUMENTS 64-20221  1/1989  Japan .

*Primary Examiner*—Patrick D. Niland
*Attorney, Agent, or Firm*—McAulay Nissen Goldberg Kiel & Hand, LLP

[57] ABSTRACT

A water-dispersable polycarbonate polyurethane resin composition obtained by creating an emulsified dispersion of a urethane prepolymer with isocyanate groups at the ends in water in the presence of an emulsifying agent if necessary, and then extending the ends with a polyamine compound containing 2 or more amino groups and/or imino groups in the molecule, wherein the polyol component used for production of the urethane prepolymer contains a polycarbonate polyol as a portion thereof, and the polyisocyanate component comprises at least 2 polyisocyanates. The composition gives a soft and resilient hand quality to treated fabrics, can be stably and reasonably produced, has excellent film formability in a suitable state of aqueous dispersion, and also has excellent water resistance, light fastness, heat resistance, oil resistance and solvent resistance.

6 Claims, No Drawings

POLYCARBONATE POLYURETHANE RESIN COMPOSITION

BACKGROUND OF THE INVENTION

1. Field of the Invention

The present invention relates to a polycarbonate polyurethane resin composition. The present invention specifically relates to a water-dispersable polycarbonate polyurethane resin composition which gives excellent oil resistance, solvent resistance, water resistance and abrasion resistance when used to treat various types of fibers, and which has a soft and resilient hand quality.

2. Description of the Related Art

Conventional processes for producing aqueous polycarbonate polyurethane resins are the same as those for producing general aqueous polyurethane resins, i.e., one or more anionic, cationic or nonionic hydrophilic groups are introduced into the polyurethane resin skeleton to render it water-soluble, or a large amount of an emulsifying agent is mixed with the hydrophobic polyurethane resin and emulsified dispersion is forcibly achieved by mechanical shear. Almost all polyisocyanates are used alone.

Water-dispersable polyurethane resins used as polymer treatment agents for aqueous solvents are characterized by a low degree of pollution, high safety and ease of handling, and using polycarbonate polyols can provide excellent physical properties including light fastness, heat resistance, hydrolysis resistance and oil resistance, to allow application in a wider range of fields.

However, while polyurethane resins obtained using polycarbonate polyols as the main polyol components give tough film strength and excellent physical properties such as light fastness, heat resistance, hydrolysis resistance and oil resistance, when they are used for padding, immersion or coating treatment of various fiber materials the hand quality of the treated fabrics tend to be very hard, thus reducing their suitability for practical use.

In contrast, self-emulsifying resins obtained by introducing hydrophilic groups into the polyurethane skeletons of the above-mentioned water-dispersable polyurethane resins can give aqueous dispersions of high molecular weight and with a highly crosslinked structure, but despite considerable efforts at improvement, the influence of the introduced hydrophilic groups has not always given satisfactory results, especially in terms of hot water resistance and long-term moist heat resistance.

Also, in the case of the hydrophobic polyurethane resins mixed with large amounts of emulsifying agents and subjected to mechanical shear for forced emulsified dispersion, the effect of the presence of the emulsifying agents in large amounts inhibits the coatability, and thus at the present time, their physical properties are unsatisfactory. Incidentally, when the amount of emulsifying agent is reduced to resolve the problem, the stability of the dispersion itself is notably impaired.

SUMMARY OF THE INVENTION

It is an object of the present invention to provide a water-dispersable polyurethane resin composition which, despite being a polyurethane resin employing a polycarbonate polyol, gives a soft and resilient hand quality to fabrics treated therewith, which can be stably and reasonably produced, and which has excellent coatability under suitable aqueous dispersion conditions, as well as excellent water resistance, light fastness, heat resistance, oil resistance and solvent resistance.

As a result of extensive research aimed at overcoming the problems mentioned above, the present inventors have found that it is effective to obtain polycarbonate polyurethane resin compositions using as the raw material a urethane prepolymer obtained from a polyol component containing a polycarbonate polyol and a polyisocyanate component composed of 2 or more polyisocyanates, and the present invention has been completed upon the basis of this finding.

Specifically, the present invention provides a water-dispersable polycarbonate polyurethane resin composition which is a water-dispersable polyurethane resin composition obtained by creating an emulsified dispersion of a urethane prepolymer with isocyanate groups at the ends in water in the presence of an emulsifying agent if necessary, and then extending the ends with a polyamine compound containing 2 or more amino groups and/or imino groups in the molecule, wherein the polyol component used for production of the urethane prepolymer contains a polycarbonate polyol as a portion thereof, and the polyisocyanate component comprises at least 2 polyisocyanates.

DESCRIPTION OF THE PREFERRED EMBODIMENTS

In the present invention, preferably, the aforementioned polycarbonate polyol is represented by the following general formula

wherein m is an integer of 4–6 and n is an integer such that the molecular weight of the polyol is between 500 and 3000, and is used in an amount constituting a proportion of 30–95 wt % with respect to the total polyol component.

Also, the polyisocyanate component preferably consists of 2 or more selected from among aromatic, aliphatic and alicyclic diisocyanates, each of which are present in an amount of at least 10 wt % with respect to the total polyisocyanate component. There are no particular restrictions on the combination of the 2 or more polyisocyanates used, and the effect of using the 2 or more polyisocyanates is to lower the crystallinity of the resulting polyurethane resin, thus giving a softer hand quality to treated articles. Also, the 2 or more polyisocyanates used are each preferably present in an amount of at least 10 wt % (for example, in the case of 2 polyisocyanates, in a weight ratio of 10:90–90:10) with respect to the total polyisocyanate component.

Furthermore, the aforementioned urethane prepolymer is preferably obtained, by reaction, with an NCO/OH molar ratio of 1.5/1.0–1.1/1.0, has a free isocyanate group content of 3.0–0.5 wt %, and contains polyoxyethylene groups in an amount of 5–30 wt % of the total polyol component, while the mechanical shear force is preferably applied during emulsified dispersion of the urethane prepolymer in water, in the presence of 0.5–10 wt % of an emulsifying agent with respect to the urethane prepolymer.

Other hydrophobic polyol components which may be used for preparation of the urethane prepolymer may be those with hydroxyl groups at the ends and having molecular weights of 500–4000, examples of which include polyester polyols produced from polyethylene adipate, polyethylenepropylene adipate, polybutylene adipate, polyethylenebutylene adipate, polyhexamethylene adipate, polydiethylene adipate, polyethylene terephthalate, polyethylene isophthalate, polyhexamethylene isophthalate adipate, polyethylene succinate, polybutylene succinate, polyethylene sebacate, polybutylene sebacate and poly-ε-caprolactam diol, and polyether-based polyols such as polyoxytetramethylene glycol and polyoxypropylene glycol.

Examples of compounds which give polyoxyethylene groups and are contained in an amount of 5–30 wt % of the total polyol component include polyoxyethylene glycol, polyoxyethylenepropylene glycol and polyoxyethylenetetramethylene glycol, having a molecular weight of 400–4000. Others may include low molecular weight polyhydric alcohols such as ethylene glycol, propylene glycol, 1,4-butanediol, trimethylolpropane, pentaerythritol and sorbitol, and addition products prepared by addition of ethylene oxide alone or ethylene oxide with one or more alkylene oxides such as propylene oxide or butylene oxide, to low molecular weight polyalkylene polyamines such as ethylenediamine, diethylenetriamine and triethylenetetramine.

The polyisocyanate component may be a commonly used aromatic, aliphatic or alicyclic polyisocyanate. Examples thereof include polyisocyanates such as tolylene diisocyanate, xylylene diisocyanate, diphenylmethane diisocyanate, naphthalene diisocyanate, 1,3-bis(isocyanatomethyl) cyclohexane, tetramethylxylylene diisocyanate, hexamethylene diisocyanate, isophorone diisocyanate, dicyclohexylmethane diisocyanate and norborane diisocyanate, and these may be used in combinations or subsequent additions of 2 or more. Among these are particularly preferred combinations of xylylene diisocyanate and isophorone diisocyanate, xylylene diisocyanate and dicyclohexylmethane diisocyanate, xylylene diisocyanate and norborane diisocyanate, diphenylmethane diisocyanate and 1,3-bis(isocyanatomethyl) cyclohexane, diphenylmethane diisocyanate and isophorone diisocyanate, hexamethylene diisocyanate and isophorone diisocyanate, and hexamethylene diisocyanate and dicyclohexylmethane diisocyanate.

For production of urethane polymers from the above-mentioned raw materials, a low molecular weight chain extender with 2 or more active hydrogen atoms, such as ethylene glycol, propylene glycol, butanediol, hexanediol, nonanediol, neopentyl glycol, diethylene glycol or trimethylol propane, may be used if necessary, either alone or in combinations of 2 or more.

The synthesis reaction for the urethane polymer with isocyanate groups at the ends may be carried out by the conventional publicly known one-shot method (one-stage) or by a multistage isocyanate polyaddition reaction, at a reaction temperature of 40°–150° C. If necessary, a reaction catalyst such as dibutyltin laurate, stannous octoate, dibutyltin-2-ethyl hexoate, triethylamine, triethylenediamine or N-methylmorpholine, or a reaction controller such as phosphoric acid, sodium hydrogen phosphate, para-toluenesulfonic acid, adipic acid or benzoyl chloride may be added.

An organic solvent which does not react with isocyanate groups may be added during the reaction stages or after completion of the reaction, and the organic solvent may be acetone, methyl ethyl ketone, methyl isobutyl ketone, tetrahydrofuran, dioxane, dimethylformamide, dimethylsulfoxide, toluene, xylene, ethyl acetate, butyl acetate or methylene chloride. Among these are particularly preferred methyl ethyl ketone, toluene and ethyl acetate. These organic solvents may be removed by heating under reduced pressure after emulsified dispersion and chain extension of the prepolymer.

The reaction of the urethane prepolymer is conducted with an NCO/OH molar ratio in the range of 1.5/1.0–1.1/1.0, and preferably in the range of 1.15/1.0–1.35/1.0, and the free isocyanate group content of the urethane prepolymer upon completion of the reaction is preferably 0.5–3.0 wt %. If the free isocyanate groups are present at less than 0.5 wt % the viscosity during the reaction increases considerably, and thus a large amount of the organic solvent is required, thus presenting a disadvantage in terms of cost and also rendering emulsified dispersion more difficult. Conversely, free isocyanate groups present at greater than 3.0 wt % result in large changes in the balance after emulsified dispersion and after chain extension with the amine, and thus hamper the long-term storage stability and working stability of the product.

Also, the polyoxyethylene content in the total polyol component used for preparation of the urethane prepolymer is preferably 5–30 wt %. At less than 5 wt % the hydrophilicity is inadequate, while the state of the emulsified dispersion becomes unstable, or else the large amount of emulsified agent used results in inferior physical properties such as coatability. At greater then 30 wt % gelation often occurs during chain extension, and thus even if a stable emulsified dispersion is obtained the water resistance of the product is notably impaired.

Any of the many commonly used conventional nonionic surfactants may be used as the emulsifying agent for emulsification of the urethane prepolymer according to the invention, but particularly preferred ones are polyoxyethylene distyrylphenyl ether-type nonionic surfactants, polyoxyethylene propylene distyrylphenyl ether-type nonionic surfactants, polyoxyethylene tristyrylphenyl ether-type nonionic surfactants and Pluronic nonionic surfactants. The amount thereof to be used will depend on the hydrophilicity due to the polyoxyethylene group content of the emulsified urethane prepolymer, but it is preferably 0.5–10 wt %, and more preferably 2–8 wt %, with respect to the urethane prepolymer. At less than 0.5 wt % it is sometimes impossible to obtain a stable emulsified dispersion state, while at greater than 10 wt % the water resistance of the product is often impaired.

The polyamine compound with 2 or more amino and/or imino groups in the molecule which is used for chain extension after emulsified dispersion of the urethane prepolymer may be ethylenediamine, tetramethylenediamine, hexamethylenediamine, diethylenetriamine, triethylenetetramine, hydrazine, piperazine, diaminodiphenylmethane, tolylenediamine, xylylenediamine, isophoronediamine, norboranediamine, etc. The amount of the polyamine compound to be used is preferably an amount containing 0.8–1.2 amino group equivalents with respect to the free isocyanate groups of the urethane prepolymer.

Although there are no particular restrictions on the method for emulsified dispersion according to the invention, a preferred method is one in which the emulsifying agent is mixed with the urethane prepolymer or an organic solvent solution of the urethane prepolymer, and emulsified dispersion in water using a homomixer or homogenizer is followed by addition of the polyamine for chain extension, or a method in which the emulsified dispersion is added to an organic solvent solution of the polyamine for chain extension. Since the emulsified dispersion strongly suppresses the reaction between the isocyanate groups of the urethane prepolymer and the water or emulsifying agent, it is preferably carried out in a temperature range of from room temperature to 40° C., and a reaction controller such as phosphoric acid, sodium hydrogen phosphate, para-toluenesulfonic acid, adipic acid or benzoyl chloride mentioned above is preferably added as well. The reaction between the urethane prepolymer and the polyamine goes to completion at a reaction temperature of 20°–50° C., usually 30 to 120 minutes after mixture of the polyurethane prepolymer and the polyamine.

The water-dispersable polycarbonate polyurethane resin composition of the invention may be used to treat any of a variety of fiber materials such as woven fabrics and nonwoven fabrics by any desired method such as padding, immersion, coating, spraying and the like, to provide the treated fabric with improved tensile, tear, abrasion and other forms of strength. The physical properties of the treated fabrics are highly superior in terms of durability of light fastness, heat resistance, hydrolysis resistance, oil resistance, washing resistance and dry cleaning resistance. Consequently, the water-dispersable polycarbonate polyurethane resin composition of the invention has high utility value in the fields of synthetic and artificial leather where such properties are in highest demand, as well as in the field of industrial materials.

In addition, the uses of the water-dispersable polycarbonate polyurethane resin composition of the invention are not necessarily limited to fiber materials, as it may be aptly used as a paint, adhesive or modifier for paper, wood, metal materials, FRP, FRTP and other such materials.

The present invention will now be explained by way of the following examples, although the invention is in no way restricted by these examples. The term "parts" in the examples refers to parts by weight, and "%" refers to percent by weight.

EXAMPLE 1

Into a 4-necked flask equipped with a stirrer, reflux condenser, thermometer and nitrogen blowing tube there were transferred 62.9 parts of polyhexamethylene carbonate diol (average molecular weight: 1000), 6.3 parts of polyoxyethylene glycol (average molecular weight: 600), 1.1 parts of neopentyl glycol, 1.4 parts of trimethylolpropane, 0.001 part of dibutyltin dilaurate and 67 parts of methyl ethyl ketone, and after uniform mixture, 11.8 parts of xylylene diisocyanate and 16.5 parts of dicyclohexylmethane diisocyanate were added and reacted therewith at 75° C. for 120 minutes, to obtain a methyl ethyl ketone solution of a urethane prepolymer with a free isocyanate group content of 2.2% with respect to the non-volatile portion. After addition and uniform mixture of 0.1 part of sodium hydrogen phosphate and 5 parts of polyoxyethylene tristyrylphenyl ether-type nonionic surfactant (HLB=13) with the solution, the mixture was transferred to another container and a dispersion blade was used for emulsifying dispersion while slowly adding 150 parts of water, and then after adding 8 parts of a 20% aqueous solution of ethylenediamine the mixture was stirred for 90 minutes. The solvent was then removed from the obtained polyurethane dispersion under reduced pressure at 50° C. to obtain a stable aqueous polyurethane dispersion with a non-volatile portion of 39.8%, a viscosity of 80 mpa.s and an average particle size of 0.8 μm.

EXAMPLE 2

Into the same type of reaction apparatus used in Example 1 there were transferred 60.5 parts of polyhexamethylene carbonate diol (average molecular weight: 1000), 9.1 parts of polyoxyethylene propylene random copolymer glycol (average molecular weight: 3000, oxyethylene group content: 70 wt %), 1.1 parts of neopentyl glycol, 1.4 parts of trimethylolpropane, 0.001 part of dibutyltin dilaurate and 67 parts of methyl ethyl ketone, and after uniform mixture, 17.9 parts of isophorone diisocyanate and 10.1 parts of diphenylmethane diisocyanate were added and reacted therewith at 75° C. for 90 minutes, to obtain a methyl ethyl ketone solution of a urethane prepolymer with a free isocyanate group content of 2.7% with respect to the non-volatile portion. After addition and uniform mixture of 0.1 part of sodium hydrogen phosphate and 5 parts of polyoxyethylene tristyrylphenyl ether-type nonionic surfactant (HLB=13) with the solution, the mixture was transferred to another container and a dispersion blade was used for emulsifying dispersion while slowly adding 150 parts of water, and then after adding 14.2 parts of a 20% aqueous solution of piperazine the mixture was stirred for 90 minutes. The solvent was then removed from the obtained polyurethane dispersion under reduced pressure at 50° C. to obtain a stable aqueous polyurethane dispersion with a non-volatile portion of 40.0%, a viscosity of 200 mpa.s and an average particle size of 1.3 μm.

EXAMPLE 3

Into the same type of reaction apparatus used in Example 1 there were transferred 43.4 parts of polyhexamethylene carbonate diol (average molecular weight: 2000), 6.1 parts of polyoxyethylene glycol (average molecular weight: 600), 31.9 parts of polytetramethylene glycol (average molecular weight: 1000), 0.8 part of 1,4-butanediol, 0.001 part of dibutyltin dilaurate and 100 parts of ethyl acetate, and after uniform mixture, 7.3 parts of hexamethylene diisocyanate and 10.6 parts of isophorone diisocyanate were added and reacted therewith at 75° C. for 200 minutes, to obtain an ethyl acetate solution of a urethane prepolymer with a free isocyanate group content of 1.8% with respect to the non-volatile portion. After addition and uniform mixture of 0.1 part of sodium hydrogen phosphate and 7 parts of polyoxyethylene tristyrylphenyl ether-type nonionic surfactant (HLB=15) with the solution, the mixture was transferred to another container and a dispersion blade was used for emulsifying dispersion while slowly adding 150 parts of water, and then after adding 18.5 parts of a 20% aqueous solution of isophorone diamine the mixture was stirred for 90 minutes. The solvent was then removed from the obtained polyurethane dispersion under reduced pressure at 50° C. to obtain a stable aqueous polyurethane dispersion with a non-volatile portion of 39.5%, a viscosity of 90 mpa.s and an average particle size of 0.6 μm.

EXAMPLE 4

Into the same type of reaction apparatus used in Example 1 there were transferred 36.0 parts of polyhexamethylene carbonate diol (average molecular weight: 1000), 8.6 parts of polyoxyethylene glycol (average molecular weight: 600), 24.0 parts of polyethylenebutylene adipate (average molecular weight: 2000), 0.9 part of ethylene glycol, 1.3 parts of trimethylolpropane, 0.001 part of dibutyltin dilaurate and 100 parts of toluene, and after uniform mixture, 9.0 parts of xylylene diisocyanate and 20.1 parts of dicyclohexylmethane diisocyanate were added and reacted therewith at 75° C. for 120 minutes, to obtain a toluene solution of a urethane prepolymer with a free isocyanate group content of 2.2% with respect to the non-volatile portion. After addition and uniform mixture of 0.1 part of sodium hydrogen phosphate and 5 parts of polyoxyethylene tristyrylphenyl ether-type nonionic surfactant (HLB=13) with the solution, the mixture was transferred to another container and a dispersion blade was used for emulsifying dispersion while slowly adding 150 parts of water, and then after adding 14.4 parts of a 20% aqueous solution of piperazine the mixture was stirred for 90 minutes. The solvent was then removed from the obtained polyurethane dispersion under reduced pressure at 50° C. to obtain a stable aqueous polyurethane dispersion with a non-volatile portion of 40.1%, a viscosity of 80 mpa.s and an average particle size of 0.9 μm.

EXAMPLE 5

The same procedure was followed as in Example 1, except for using a Pluronic nonionic surfactant (Adeka Pluronic L-72, product of Asahi Denka, KK.) instead of the polyoxyethylene tristyrylphenyl ether-type nonionic surfactant used in Example 1, to obtain a stable aqueous polyurethane dispersion with a non-volatile portion of 39.7%, a viscosity of 120 mpa.s and an average particle size of 1.1 μm.

COMPARATIVE EXAMPLE 1

Into the same type of reaction apparatus used in Example 1 there were transferred 66.5 parts of polyhexamethylene carbonate diol (average molecular weight: 1000), 9.0 parts of polyoxyethylene glycol (average molecular weight: 600), 0.9 part of ethylene glycol, 0.001 part of dibutyltin dilaurate and 100 parts of methyl ethyl ketone, and after uniform mixture, 7.1 parts of xylylene diisocyanate and 16.4 parts of dicyclohexylmethane diisocyanate were added and reacted therewith at 75° C. for 250 minutes, to obtain a methyl ethyl ketone solution of a urethane prepolymer with a free isocyanate group content of 0.3% with respect to the non-volatile portion. After addition and uniform mixture of 0.1 part of sodium hydrogen phosphate and 5 parts of polyoxyethylene tristyrylphenyl ether-type nonionic surfactant (HLB=15) with the solution, the mixture was transferred to another container and a dispersion blade was used for emulsifying dispersion while slowly adding 150 parts of water, during which process the viscosity increased notably, thus hampering the emulsifying dispersion.

COMPARATIVE EXAMPLE 2

Into the same type of reaction apparatus used in Example 1 there were transferred 55.6 parts of polyhexamethylene carbonate diol (average molecular weight: 1000), 10.0 parts of polyoxyethylene glycol (average molecular weight: 600), 1.0 part of ethylene glycol, 0.001 part of dibutyltin dilaurate and 67 parts of methyl ethyl ketone, and after uniform mixture, 7.8 parts of xylylene diisocyanate and 22.5 parts of dicyclohexylmethane diisocyanate were added and reacted therewith at 75° C. for 40 minutes, to obtain a methyl ethyl ketone solution of a urethane prepolymer with a free isocyanate group content of 4.2% with respect to the non-volatile portion. After addition and uniform mixture of 0.1 part of sodium hydrogen phosphate and 7 parts of polyoxyethylene tristyrylphenyl ether-type nonionic surfactant (HLB=15) with the solution, the mixture was transferred to another container and a dispersion blade was used for emulsifying dispersion while slowly adding 150 parts of water, and upon adding 15.0 parts of a 20% aqueous solution of ethylenediamine and stirring for 10 minutes, demulsification of the dispersion resulted in a pasty substance.

COMPARATIVE EXAMPLE 3

Into the same type of reaction apparatus used in Example 1 there were transferred 59.2 parts of polyhexamethylene carbonate diol (average molecular weight: 1000), 10.3 parts of polyoxyethylene propylene random copolymer glycol (average molecular weight: 3000, oxyethylene group content: 70 wt %), 1.2 parts of 1,4-butanediol, 1.5 parts of trimethylolpropane, 0.001 part of dibutyltin dilaurate and 67 parts of methyl ethyl ketone, and after uniform mixture, 27.8 parts of isophorone diisocyanate was added and reacted therewith at 75° C. for 150 minutes, to obtain a methyl ethyl ketone solution of a urethane prepolymer with a free isocyanate group content of 2.7% with respect to the non-volatile portion. After addition and uniform mixture of 0.1 part of sodium hydrogen phosphate and 5 parts of polyoxyethylene tristyrylphenyl ether-type nonionic surfactant (HLB=13) with the solution, the mixture was transferred to another container and a dispersion blade was used for emulsifying dispersion while slowly adding 150 parts of water, and then after adding 13.7 parts of a 20% aqueous solution of piperazine the mixture was stirred for 90 minutes. The solvent was then removed from the obtained polyurethane dispersion under reduced pressure at 50° C. to obtain a stable aqueous polyurethane dispersion with a non-volatile portion of 40.0%, a viscosity of 100 mpa.s and an average particle size of 0.5 μm.

COMPARATIVE EXAMPLE 4

Into the same type of reaction apparatus used in Example 1 there were transferred 59.2 parts of polytetramethylene glycol (average molecular weight: 1000), 10.3 parts of polyoxyethylene propylene random copolymer glycol (average molecular weight: 3000, oxyethylene group content: 70 wt %), 1.2 parts of 1,4-butanediol, 1.5 parts of trimethylolpropane, 0.001 part of dibutyltin dilaurate and 67 parts of methyl ethyl ketone, and after uniform mixture, 27.8 parts of isophorone diisocyanate was added and reacted therewith at 75° C. for 150 minutes, to obtain a methyl ethyl ketone solution of a urethane prepolymer with a free isocyanate group content of 2.7% with respect to the non-volatile portion. After addition and uniform mixture of 0.1 part of sodium hydrogen phosphate and 5 parts of polyoxyethylene tristyrylphenyl ether-type nonionic surfactant (HLB=13) with the solution, the mixture was transferred to another container and a dispersion blade was used for emulsifying dispersion while slowly adding 150 parts of water, and then after adding 13.7 parts of a 20% aqueous solution of piperazine the mixture was stirred for 90 minutes. The solvent was then removed from the obtained polyurethane dispersion under reduced pressure at 50° C. to obtain a stable aqueous polyurethane dispersion with a non-volatile portion of 39.9%, a viscosity of 170 mpa.s and an average particle size of 0.8 μm.

The following methods were used to measure the film properties of each of the aqueous polyurethane dispersions obtained in Examples 1 to 5 and Comparative Examples 3 and 4, and the properties of coated fabrics prepared by treatment of polyester nonwoven fabrics.

Measurement of film properties (Film formation)

The polyurethane dispersions obtained in Examples 1 to 5 and Comparative Examples 3 and 4 were cast in stainless steel cases and air dried to form approximately 0.3 mm-thick films which were then subjected to heat treatment at 130° C. for 20 minutes.

(Measurement of film properties)

The films were cut into test pieces using a No.3 dumbbell cutter, and then an autograph (AG-500D, product of Shimazu Laboratories, KK.) was used to measure the film properties at a tensile rate of 300 mm/min.

Measurement of treated fabric properties

Polyester nonwoven fabrics (weight: 150 g/m²) were treated by padding treatment (1 dip-1 nip) with 40% aqueous solutions of each of the aqueous polyurethane dispersions obtained in Examples 1 to 5 and Comparative Examples 3 and 4 (100% pickup). The treated fabrics were then heat dried at 120° C. for 5 minutes and the properties of the fabrics were measured.

The results are given in Table 1.

TABLE 1

|  |  | Properties | Ex. 1 | Ex. 2 | Ex. 3 | Ex. 4 | Ex. 5. | Comp. Ex. 3 | Comp. Ex. 4 | Untreated |
|---|---|---|---|---|---|---|---|---|---|---|
| Film properties | *1 initial | 100% modulus (kg/cm²) | 35 | 26 | 18 | 32 | 34 | 45 | 15 | |
| | | tensile strength (kg/cm²) | 410 | 290 | 310 | 330 | 400 | 330 | 220 | |
| | | elongation at break (%) | 456 | 530 | 610 | 470 | 460 | 510 | 640 | |
| | *2 after heat resistance | 100% modulus (kg/cm²) | 33 | 27 | 16 | 32 | 33 | 42 | 8 | |
| | | tensile strength (kg/cm²) | 420. | 260 | 270 | 320 | 370 | 300 | 42 | |
| | | elongation at break (%) | 440 | 650 | 450 | 450 | 470 | 700 | | |
| | *3 after hydrolysis resistance test | 100% modulus (kg/cm²) | 37 26 | 19 | 30 | 35 | 46 | 16 | | |
| | | tensile strength (kg/cm²) | 420 | 310 | 330 | 280 | 400 | 340 | 180 | |
| | | elongation at break (%) | 440 | 510 | 600 | 440 | 450 | 510 | 620 | |
| | *4 after oil resistance test | 100% modulus (kg/cm²) | 28 | 22 | 12 | 26 | 26 | 18 | 7 | |
| | | tensile strength (kg/cm²) | 220 | 160 | 120 | 170 | 190 | 120 | 25 | |
| | | elongation at break (%) | 380 | 520 | 410 | 390 | 340 | 220 | | |
| | | 430 | | | | | | | | |
| Treated fabric properties | | *5 hand quality (softness). | 5 | 7 | 8 | 6 | 7 | 3 | 9 | 10 |
| | | *6 abrasion resistance | 8 | 8 | 7 | 8 | 8 | 4 | 1 | |
| | | *7 tensile strength kg/3 cm) | 45 | 48 | 51 | 48 | 46 | 49 | 37 | 35 |

*1: heat treatment after film formation, 130° C. × 20 minutes
2: treatment at 120° C. × 100 hours
3: treatment at 70° C., 95% RH × 2 weeks
4: immersion in oleic acid at 45° C. × 1 day
5: touch softness: level 10 (soft) to 1 (hard)
6: taper abrasion test: soft ring, 500 g load × 2000, level 10 (good) to 1 (poor)
7: according to JIS L-1096 A method The water-dispersable polycarbonate-based polyurethane resin compositions of Examples 1 to 5 of the present invention exhibited excellent film properties and treated fabric properties, as well as a soft hand quality.

The water-dispersable polycarbonate-based polyurethane resin composition according to the invention gives the toughness and excellent light fastness, heat resistance, hydrolysis resistance and oil resistance which are characteristic of polycarbonate-based polyurethane resins, while also eliminating the hard hand quality resulting from treatment of various fiber materials, which has been a drawback of polycarbonate-based polyurethane resins, to provide soft hand quality comparable to that of polyether-based polyurethanes. In addition, from the standpoint of environmental destruction and operating environment which have become issues in recent years, they can give as polymer treatment agents in aqueous solvents which are characterized by a low degree of pollution, high safety and ease of handling, with excellent emulsion stability.

I claim:

1. A water-dispersable polycarbonate polyurethane resin composition which is a water-dispersable polyurethane resin composition obtained by creating an emulsified dispersion of a urethane prepolymer with isocyanate groups at the ends in water in the presence of an emulsifying agent if necessary, and then extending the ends with a polyamine compound containing 2 or more amino groups and/or imino groups in the molecule, the polyol component used for production of the urethane prepolymer contains a polycarbonate-based polyol as a portion thereof, and the polyisocyanate component comprises at least 2 polyisocyanates.

2. A water-dispersable polycarbonate polyurethane resin composition according to claim 1, wherein said polycarbonate-based polyol is represented by the following general formula

$$HO-(-(CH_2)_mOCOO-)_n-(CH_2)_mOH$$

wherein m is an integer of 4–6 and n is an integer such that the molecular weight of the polyol is between 500 and 3000, and is used in an amount constituting a proportion of 30–95 wt % with respect to the total polyol component.

3. A water-dispersable polycarbonate polyurethane resin composition according to claim 1, wherein said polyisocyanate component consists of 2 or more selected from aromatic, aliphatic and alicyclic diisocyanates, each of which are present in an amount of at least 10 wt % with respect to the total polyisocyanate component.

4. A water-dispersable polycarbonate polyurethane resin composition according to claim 1, wherein said urethane prepolymer is obtained by reaction with an NCO/OH molar ratio of 1.5/1.0–1.1/1.0, has a free isocyanate group content of 3.0–0.5 wt %, and contains polyoxyethylene groups in an amount of 5–30 wt % of the total polyol component.

5. A water-dispersable polycarbonate polyurethane resin composition according to claim 1, wherein mechanical shear force is applied during emulsified dispersion of the urethane prepolymer in water, in the presence of 0.5–10 wt % of an emulsifying agent with respect to the urethane prepolymer.

6. The water-dispersable polycarbonate polyurethane resin composition according to claim 1, wherein said polyisocyanates are selected from the group of combinations consisting of xylylene diisocyanate and isophorone diisocyante, xylylene diisoxyanate and dicyclohexylmethane diisocyante, xylylene diisocyanate and norborane diisocyanate, diphenylmethane diisocyanate and 1,3-bis (isocyanatomethyl)cyclohexane, diphenylmethane diisocyanate and isophorone diisocyanate, hexamethylene diisocyanate and isophorone diisocyanate, and hexamethylene diisocyanate and dicyclohexylmethane diisocyanate.

* * * * *